(12) United States Patent
Cropper et al.

(10) Patent No.: US 10,255,096 B2
(45) Date of Patent: *Apr. 9, 2019

(54) TEMPORAL DYNAMIC VIRTUAL MACHINE POLICIES

(71) Applicant: International Business Machines Corporation, Armonk, NY (US)

(72) Inventors: Joseph W. Cropper, Rochester, MN (US); Jeffrey W. Tenner, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/493,307

(22) Filed: Apr. 21, 2017

(65) Prior Publication Data

US 2017/0220376 A1 Aug. 3, 2017

Related U.S. Application Data

(63) Continuation of application No. 14/952,525, filed on Nov. 25, 2015, now Pat. No. 9,678,784, which is a
(Continued)

(51) Int. Cl.
*G06F 9/455* (2018.01)
*G06F 1/3234* (2019.01)
(Continued)

(52) U.S. Cl.
CPC ........ *G06F 9/45558* (2013.01); *G06F 1/3203* (2013.01); *G06F 1/3234* (2013.01);
(Continued)

(58) Field of Classification Search
CPC ............... G06F 9/45558; G06F 1/3296; G06F 2009/45562; G06F 2009/4557
See application file for complete search history.

(56) References Cited

U.S. PATENT DOCUMENTS 7,765,543 B1 7/2010 Weissman et al.
8,141,075 B1 3/2012 Chawla et al.
(Continued)

FOREIGN PATENT DOCUMENTS

EP 2304564 A2 4/2011
EP 2761441 A1 8/2014
(Continued)

OTHER PUBLICATIONS

Marcus Vinicius Azevedo, et al "Resource optimization and energy saving in clusters using virtualization" (Year: 2011).*
(Continued)

*Primary Examiner* — Andy Ho
*Assistant Examiner* — Abdou K Seye
(74) *Attorney, Agent, or Firm* — Middleton Reutlinger

(57) ABSTRACT

Temporal dynamic policies may be used to effectively alter the management of a virtual machine in a virtualized computing environment based upon some temporal condition such as how long a virtual machine has been active or idle, how long it has been since the virtual machine was created or deployed, etc. The altered management may be used, for example, to activate various performance and/or reliability-related technologies such as high availability and failover functionality for longer-running virtual machines.

18 Claims, 7 Drawing Sheets

Related U.S. Application Data continuation of application No. 14/882,788, filed on Oct. 14, 2015, now Pat. No. 9,678,783.

(51) Int. Cl.
*G06F 1/3203* (2019.01)
*G06F 1/3296* (2019.01)

(52) U.S. Cl.
CPC .... *G06F 1/3296* (2013.01); *G06F 2009/4557* (2013.01); *G06F 2009/45562* (2013.01); *G06F 2009/45575* (2013.01)

(56) References Cited

U.S. PATENT DOCUMENTS

| | | | |
|---|---|---|---|
| 8,185,894 B1 | 5/2012 | Watson et al. | |
| 8,185,895 B2 | 5/2012 | Ko et al. | |
| 2007/0245348 A1 | 10/2007 | Araujo, Jr. et al. | |
| 2008/0209016 A1 | 8/2008 | Karve et al. | |
| 2014/0101665 A1* | 4/2014 | Mousseau | G06F 9/5072 718/104 |
| 2014/0137107 A1* | 5/2014 | Banerjee | G06F 1/3234 718/1 |
| 2014/0137112 A1 | 5/2014 | Rigolet | |
| 2015/0020151 A1 | 1/2015 | Ramanathan | |
| 2015/0143366 A1* | 5/2015 | Suragi Math | G06F 9/5072 718/1 |
| 2016/0139948 A1 | 5/2016 | Beveridge et al. | |

FOREIGN PATENT DOCUMENTS

| | | |
|---|---|---|
| WO | 20100057775 A2 | 5/2010 |
| WO | 2013048422 A2 | 4/2013 |
| WO | 2013070481 A1 | 5/2013 |

OTHER PUBLICATIONS

Stefan Groesbrink et al "A Criticality-Aware Mapping of Real-time Virtual Machines to Multi-core Processors" (Year: 2014).*
Ta-Shma, Paula, et al; "Virtual machine time travel using continuous data protection and checkpointing." ACM SIGOPS Operating Systems Review 42, No. 1 (2008): 127-134.
Soman, Sunil, et al;"Task-aware garbage collection in a multi-tasking virtual machine." In Proceedings of the 5th international symposium on Memory management, pp. 64-73. ACM, 2006.
List of IBM Patents or Patent Applications Treated As Related.
U.S. Patent and Trademark Office, Office Action issued in related U.S. Appl. No. 14/882,788 dated Sep. 1, 2016.
U.S. Patent and Trademark Office, Office Action issued in related U.S. Appl. No. 14/952,525 dated Sep. 2, 2016.
U.S. Patent and Trademark Office, Notice of Allowance issued in related U.S. Appl. No. 14/882,788 dated Feb. 10, 2017.
U.S. Patent and Trademark Office, Notice of Allowance issued in related U.S. Appl. No. 14/952,525 dated Feb. 10, 2017.
U.S. Patent and Trademark Office, Office Action issued in related U.S. Appl. No. 15/493,293 dated Jan. 31, 2018.

* cited by examiner

400 — Create/Edit Temporal Dynamic Policy

402 — Name
408 — Policy Name: HostGroupA

404 — Condition
410 — Perform action [30] days after VM is  412 — Activated ▽
- Created
- Deployed
- Activated
- Deactivated
- Idled
- Modified 406 — Action
414 —
○ Create redundant storage path for VM
● Move VM to HA host group
○ Change storage connectivity group
○ Change VM resource allocation
○ Enable energy optimization policy
○ Remove redundant storage path for VM
○ Disable HA 416 — [Configure Action...]   418 — ☐ Prompt administrator first 420 — [Save]   422 — [Cancel]

FIG. 8

TEMPORAL DYNAMIC VIRTUAL MACHINE POLICIES

BACKGROUND

The invention is generally related to computers and computer software, and in particular, to logically-partitioned and virtualized computing environments.

Computing technology has advanced at a remarkable pace, with each subsequent generation of computing system increasing in performance, functionality, and storage capacity, often at reduced cost. In addition, workload allocation of computing and other hardware resources is often employed to maximize the utilization of hardware resources such as processors, memories, networks, storage devices, etc., and thereby reduce the overall costs necessary for supporting a desired workload capacity. Optimizing workload allocation can also have a positive impact on power costs and environmental concerns due to a reduction in the amount of hardware resources required to support a given workload.

Many computer or data processing systems employ virtualization, also referred to as logical partitioning, which enables one or more individual physical computers to each run several operating environments, or operating systems, at once in a virtualized computing environment. In some instances, for example, a single physical computer, which may also be referred to as a host, can run a plurality of operating systems in a corresponding plurality of virtual machines (VMs), also referred to as logical partitions (LPARs). Each operating system resides in its own virtual machine, with each virtual machine allocated a part of a physical processor, an entire physical processor, or multiple physical processors from the computer. Additionally, a portion of the computer's memory may be allocated to each virtual machine. An underlying partition manager, often referred to as a hypervisor or virtual machine monitor (VMM), manages and controls the virtual machines. The hypervisor is typically a part of the system firmware and manages the allocation of resources to the operating systems and virtual machines. As such, one physical computer may run one or more virtual machines and thus virtualize the underlying hardware resources used by the applications, operating systems, and other program code configured to operate in those virtual machines.

Virtualization is increasingly used in data centers and cloud computing applications, which may provide for cost efficiencies through elastic computing, whereby hardware resources from multiple hosts are provisioned and de-provisioned based on workload changes. In such applications, individual workloads may change over time, and as such virtualization may be employed to effectively multiplex hardware resources over multiple workloads to provide an overall greater resource utilization. In order to balance costs, an assumption may be made that not all workloads will run with maximum resource requirements at the same time, so fewer hardware resources than the sum of all maximum resource requirements for workloads may be allocated for a given set of workflows, resulting in the hardware resources being overcommitted. As one example, a cloud provider may allocate more virtual processors (CPUs) across multiple virtual machines on a particular host computer under the assumption that some of the virtual machines will only run at off-peak hours when other virtual machines are shut down or otherwise deactivated.

Some data centers and cloud computing applications may also support the virtualization of other types of hardware resources, such as storage devices and networks, which may enable virtual machines to access virtual networks and/or storage devices, and with the particulars of the underlying hardware supporting such virtual entities managed in a manner that is effectively hidden from the virtual machines. The allocation of such hardware resources to virtual machines may also impact performance and efficiency, as overloading networks and/or storage devices can lead to slow response times, and in some instances, to an inability of a virtual machine to connect to an underlying hardware resource.

Virtualized computing environments may also utilize various technologies that may be used to improve performance and/or reliability. For example, high availability techniques may be employed to handle fault situations, e.g., to automatically restart a virtual machine if the virtual machine is detected to have gone down, to rebuild a virtual machine on a new host if an original host unexpectedly crashes or loses power. In addition, load balancing may be employed to dynamically migrate virtual machines to different hosts, e.g., whenever one host is overloaded and excess capacity is available on another host. Furthermore, energy efficiency is often a concern in many data centers, and as a result, it may be desirable in some instances to consolidate virtual machines on fewer numbers of hosts to enable unused hosts to be powered down.

While these performance and/or reliability-related technologies can prove to be valuable in some situations, in other situations they may be unnecessary, or may even have an adverse impact on system performance. As but one example, the overhead associated with migrating virtual machines to different hosts for failover or load balancing concerns may be unnecessary if the virtual machines do not continue to operate on the new hosts for appreciable amounts of time. Moreover, if virtual machines are constantly being created and destroyed, consolidating virtual machines to reduce power consumption may be counterproductive, as the overhead associated with powering down a host and then restarting the host to accommodate newly-created virtual machines may exceed any savings that may have occurred due to the consolidation.

As such, the aforementioned performance and/or reliability-related technologies are generally only used when intentionally and manually enabled by an administrator. Leaving such decisions to an administrator, however, can lead to sub-optimal system configurations, and moreover, even if an optimal configuration is initially selected, subsequent changes in a system can render a previously-optimal system configuration sub-optimal. In some instances, moreover, it may not be known whether a virtual machine will be long-running or short-running at the time the virtual machine is created and deployed, so an optimal configuration may not be knowable for that virtual machine at the time of deployment.

Accordingly, a continuing need exists in the art for an improved manner of managing virtual machines in a virtualized computing environment.

SUMMARY

According to an embodiment of the present invention, a virtualized computing environment may be managed by collecting a temporal attribute for a virtual machine deployed in the virtualized computing environment, determining a temporal condition and a virtual machine management action associated with a policy for the virtual machine, where the virtual machine management action is associated with a modification of the virtualized computing environment, determining from the collected temporal attribute for the virtual machine whether the determined temporal condition is met, and initiating the determined virtual machine management action in response to determining that the determined temporal condition is met to modify the virtualize runtime environment such that the virtual machine executes in the modified virtualized computing environment.

Some embodiments, for example, may utilize policies referred to herein as "temporal dynamic policies" to effectively alter the management of a virtual machine based upon some temporal condition such as how long a virtual machine has been active or idle, how long it has been since the virtual machine was created or deployed, etc. The altered management, as but one example, may be used in some embodiments to activate various performance and/or reliability-related technologies such as high availability and failover functionality for longer-running virtual machines, even when it is not yet known whether virtual machines, when created, will ever be long-running.

In some embodiments, collecting the temporal attribute for a virtual machine may include determining a time or duration associated with creation, deployment, activation, deactivation or idling of the virtual machine, and in some embodiments, collecting the temporal attribute for the virtual machine may include determining a time or duration associated with a modification to the virtualized runtime environment from a prior virtual machine management action. Further, in some embodiments, determining the temporal condition and the virtual machine management action may include retrieving the policy from a data store.

In addition, in some embodiments, a policy may further include a suggest flag, and initiating the determined virtual machine management action may include selectively generating a notification suggesting the determined virtual machine management action based upon the suggest flag. In some embodiments, the temporal attribute may be associated with an event, the temporal condition may include a threshold duration, and determining whether the temporal condition is met may include determining whether a duration from the event meets or exceeds the threshold duration. In some embodiments, collecting the temporal attribute, determining the temporal condition and virtual machine management action, determining whether the determined temporal condition is met, and initiating the determined virtual machine management action may be performed by a monitor task, and in some embodiments, the monitor task may be resident in a scheduler of a cloud computing framework.

Some embodiments may also include associating the policy with the virtual machine in connection with deploying the virtual machine to the virtualized computing environment. In some such embodiments, associating the policy with the virtual machine may be performed in response to user input, while in some such embodiments, the policy may be associated with one or more hosts in the virtualized computing environment, and associating the policy with the virtual machine may be performed in response to placement of the virtual machine on a host among the one or more hosts. Further, in some such embodiments, the policy may be associated with a virtual machine template, and associating the policy with the virtual machine may be performed based upon creation of the virtual machine from the virtual machine template.

In some embodiments, the virtual machine management action activates or deactivates high availability functionality for the virtual machine, and in some embodiments, the virtual machine management action activates or deactivates placement optimization functionality for the virtual machine. Further, in some embodiments, the virtual machine management action causes the virtual machine to be migrated to a different host. In some embodiments, the virtual machine management action migrates the virtual machine to the different host to provide additional high availability support to the virtual machine, while in some embodiments, the virtual machine management action migrates the virtual machine to the different host to enable a prior host to which the virtual machine was previously deployed to be transitioned to a lower power state.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 8 is a block diagram for an example user interface for creating a temporal dynamic policy in the virtualized computing environment of FIGS. 3A-3B.

DETAILED DESCRIPTION

Figure 1:
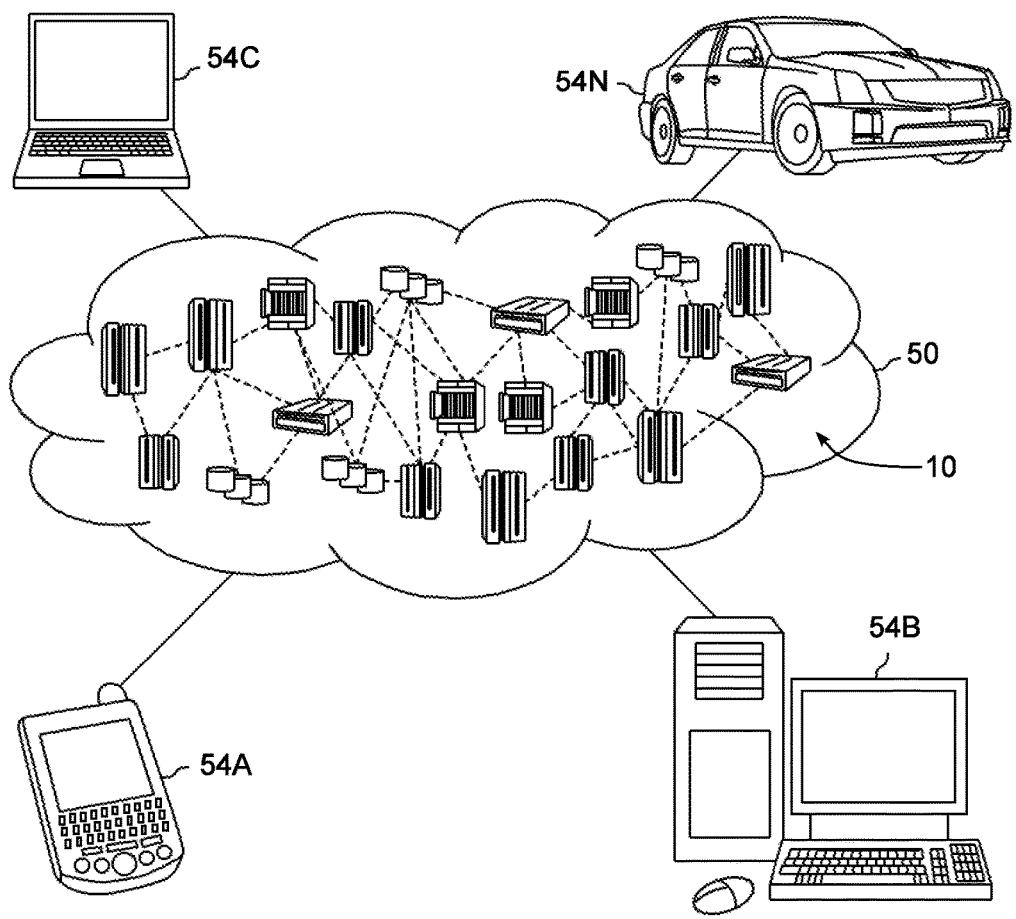
FIG. 1 depicts an example cloud computing environment consistent with the invention.

It is understood in advance that although this disclosure includes a detailed description on cloud computing, implementation of the teachings recited herein are not limited to a cloud computing environment. Rather, embodiments of the invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to the Drawings, wherein like numbers denote like parts throughout the several views, FIG. 1 depicts an illustrative cloud computing environment 50 suitable for use in embodiments consistent with the invention. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
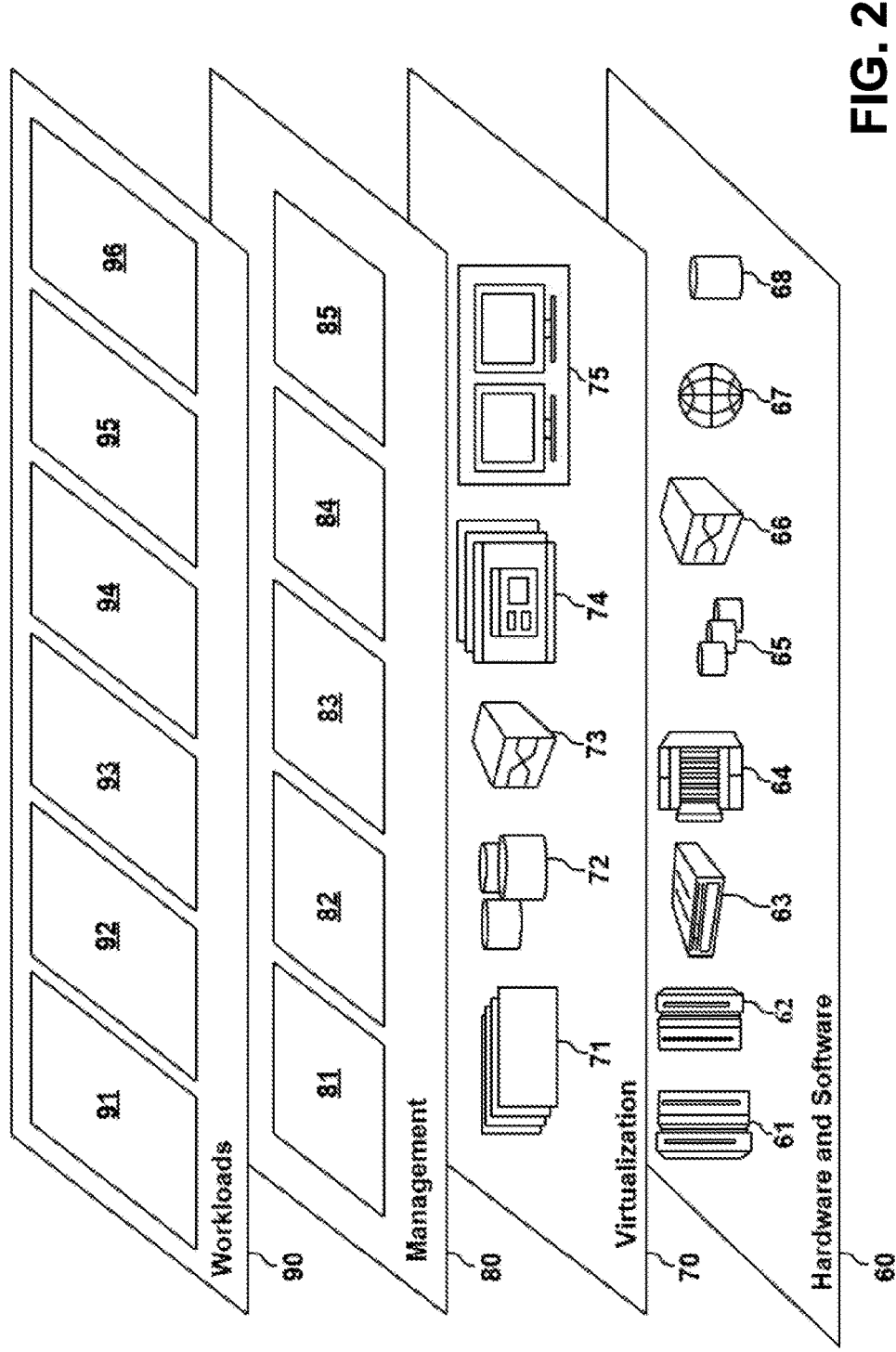
FIG. 2 depicts abstraction model layers according to an example embodiment consistent with the invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Figure 3A:
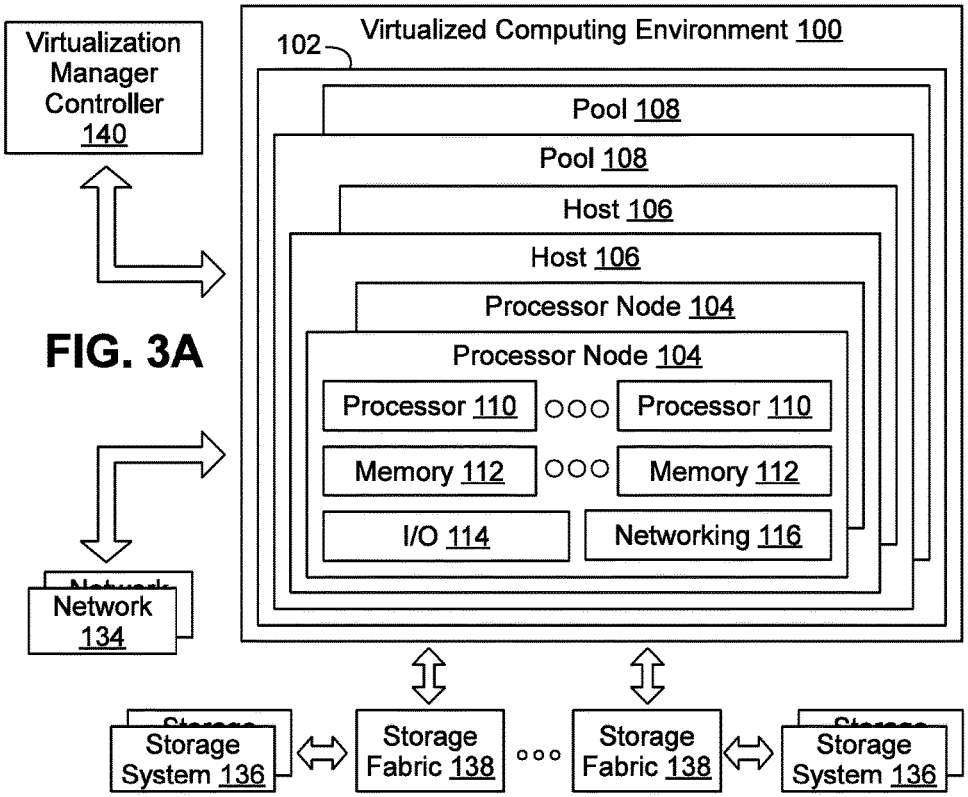
FIGS. 3A and 3B are block diagrams of an example hardware (FIG. 3A) and software (FIG. 3B) environment suitable for implementing a virtualized computing environment consistent with the invention.
Figure 3B:
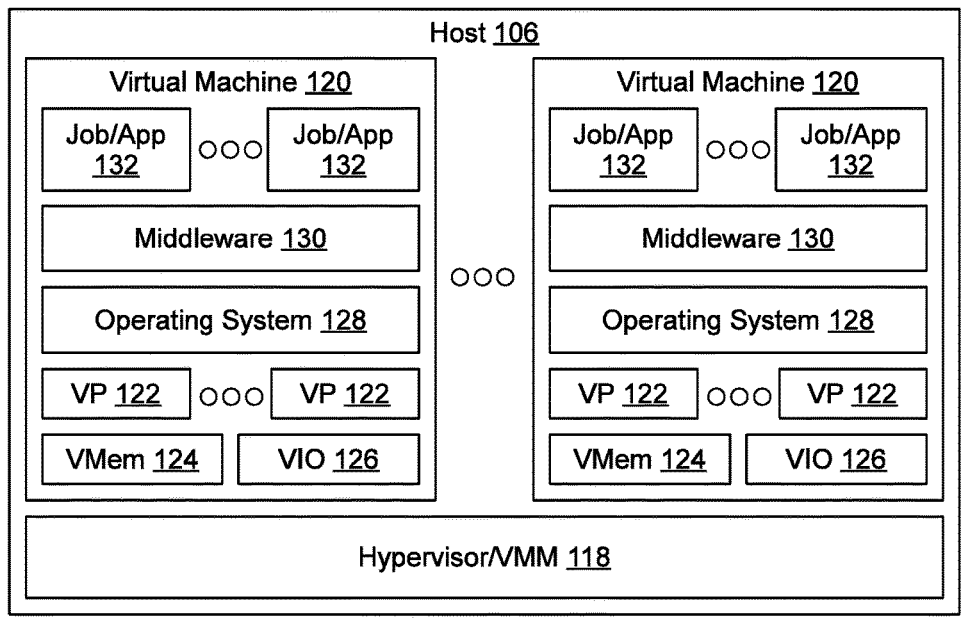

FIGS. 3A-3B illustrate the principal hardware and software components in a virtualized computing environment or apparatus 100 consistent with the invention, and suitable for implementation in a cloud computing environment such as environment 50, as well as in other cloud and/or non-cloud computing environments. As shown in FIG. 3A, apparatus 100 may include a multi-node data processing system 102 where the physical hardware is distributed among a plurality of physical processor nodes 104 disposed in a plurality of hosts or computer systems 106, with the hosts 106 disposed in one or more pools 108. Each processor node 104 includes one or more processors 110, one or more memory devices 112, and in some embodiments, additional hardware such as input/output (I/O) hardware 114 (e.g., one or more input/output (I/O) adapters) and/or networking hardware 116. Appropriate networking functionality (not shown) may also be used to provide data communication between the various processor nodes 104 and hosts 106, as well as other external systems.

Apparatus 100 may be implemented using any of a number of different architectures suitable for implementing a virtualized environment. For example, in one embodiment, apparatus 100 may include one or more of a Power 770, 780 or 795 system available from International Business Machines Corporation, the configuration of which will be apparent to one of ordinary skill in the art having the benefit of the instant disclosure. It will be appreciated, however, that other architectures suitable for executing virtualized environments may be used in other embodiments of the invention, so the invention is not limited to the particular architecture disclosed herein.

Each processor 110 may be implemented as a single or multi-threaded processor and/or as a single or multi-core processor, while each memory 112 may be considered to include one or more levels of memory devices, e.g., a DRAM-based main storage, as well as one or more levels of data, instruction and/or combination caches, with certain caches either serving individual processors or multiple processors as is well known in the art. In addition, the memory of apparatus 100 may be considered to include memory storage physically located elsewhere in apparatus 100, e.g., any cache memory in a processor, as well as any storage capacity used as a virtual memory, e.g., as stored on a mass storage device or on another computer coupled to apparatus 100.

Apparatus 100 operates under the control of one or more kernels, hypervisors, operating systems, etc., and executes or otherwise relies upon various computer software applications, components, programs, objects, modules, data structures, etc., as will be described in greater detail below. Moreover, various applications, components, programs, objects, modules, etc. may also execute on one or more processors in another computer coupled to apparatus 100 via network, e.g., in a distributed or client-server computing environment, whereby the processing required to implement the functions of a computer program may be allocated to multiple computers over a network.

For example, FIG. 3B illustrates various software components 118-132 that may be resident within a host 106 in apparatus 100. A hypervisor or virtual machine monitor (VMM) 118 may host one or more virtual machines (VMs) 120 and may allocate to each virtual machine 120 a portion of the physical hardware resources of host 106 (e.g., processor, memory and/or 10 resources associated with one or more processor nodes 104), represented here by one or more virtual processors (VPs) 122, a virtual memory (VMem) 124 and virtual input/output (VIO) resources 126. Each virtual machine 120 may in turn host an operating system 128 and optionally middleware 130, as well as one or more jobs and/or applications 132. It will be appreciated that each virtual machine 120, which may also be referred to as a logical partition, virtual server or virtual computer, may operate in a manner that emulates a separate physical computer, and as such, may host practically any software components capable of being hosted by a computer.

Additional hardware and/or software components may also be resident in apparatus 100, e.g., mass storage hardware, external input/output devices such as printers or displays, and management hardware and/or software, e.g., a hardware management console (HMC) through which the hardware and/or software configuration of the apparatus may be managed by an administrator. Further, in the illustrated embodiments, connectivity to one or more external networks 134 may also be supported, as may connectivity to one or more storage systems 136 through one or more storage fabrics 138. Virtualized environments may be implemented in an innumerable number of manners, and may include an innumerable number of hardware and/or software variations, and as such, the invention is not limited to the particular implementation disclosed herein.

It will be appreciated that the present invention may be a system, a method, and/or a computer program product. The computer program product may include a computer readable storage medium (or media) having computer readable program instructions thereon for causing one or more processors to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the drawings illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition, computer readable program instructions, of which one or more may collectively be referred to herein as "program code," may be identified herein based upon the application within which such instructions are implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the example environment illustrated in FIGS. 1, 2, 3A and 3B is not intended to limit the present invention. Indeed, those skilled in the art will recognize that other alternative hardware and/or software environments may be used without departing from the scope of the invention.

Temporal Dynamic Policies

Many virtual machines (VMs), particularly virtual machines used in cloud computing environments, are commonly referred to as either being short-running or long-running. Short-running virtual machines typically are active for a few days or weeks and then get destroyed, whereas long-running virtual machines (which are generally more common in traditional enterprise environments) may be active for several weeks, months or even years. Sometimes virtual machines can also effectively transition from short-running to long-running through various "promotion" cycles, e.g., when being transitioned from development, to test, and to production. A virtual machine being tested or still under development, for example, may only run briefly to ensure that the virtual machine is operating as intended, whereas once development and testing is complete, the virtual machine may go into production and run for an indeterminate amount of time.

Many virtualization computing environments support various performance and/or reliability-related technologies such as high availability and ongoing optimization. High availability techniques may include, for example, automatically restarting a virtual machine if the virtual machine is detected to have gone down, or automatically rebuilding a virtual machine on a new host in the event an original host has unexpectedly crashed (e.g., due to power loss). Ongoing optimization techniques may include, for example, live migrating a virtual machine onto a different host whenever an original host upon which the virtual machine is active has exceeded some threshold (e.g., CPU utilization is too high), thereby reducing the overall load on the original host and lowering it below the threshold. Many virtualization computing environments also employ automated energy policies that, for example, may attempt to consolidate virtual machines onto fewer numbers of hosts to enable one or more hosts to be powered down or hibernated and thereby conserve power.

For long-running virtual machines, such techniques can provide significant benefits to the overall solution. For shorter-running virtual machines, however, the effects of such techniques can be negligible, and in some instances, can be detrimental due to the fact that the techniques may rely on assumptions about workload and placement that are stale and/or changing rapidly in view of short-running virtual machines being activated and deactivated.

Performance and/or reliability-related technologies are generally enabled or disabled through manual intervention by an administrator. Doing so, however, presents an administrative burden and can lead to sub-optimal configurations if not administered properly. Furthermore, given the often-rapidly changing workloads of many virtualized computing environments, a configuration that may be adequate at one point in time may no longer be adequate after the overall workload in a system has changed. Moreover, the potential lifetimes of some virtual machines may be unknown at deployment, so selection of a suitable configuration may be based on little more than educated guessing.

Embodiments consistent with the invention, on the other hand, utilize policies, referred to herein as temporal dynamic policies, that are associated with virtual machines and monitored on an on-going basis to perform one or more virtual machine management actions in response to meeting particular temporal conditions, thereby enabling dynamic modifications to be made to a virtualized computing environment, and in many instances, without any administrator input.

Temporal dynamic policies, for example, may be used to dynamically drive dynamic reconfiguration of a virtual machine and/or placement optimizations based on a virtual machine's "age" or other temporal metric. In some embodiments, for example, for virtual machines that are only in existence for a few days, properties such as high availability and ongoing optimization are probably of lesser concern. However, for virtual machines that are long-running, such properties can be of much higher importance as such virtual machines may have a higher potential to encounter a failure (addressed by 'high availability') and/or impact their source host's performance (addressed by ongoing optimization).

In some embodiments of the invention, virtual machine management may be performed in a virtualized computing environment by collecting a temporal attribute for a virtual machine deployed in the virtualized computing environment, determining a temporal condition and a virtual machine management action associated with a policy for the virtual machine, determining from the collected temporal attribute for the virtual machine whether the determined temporal condition is met, and initiating the determined virtual machine management action in response to determining that the determined temporal condition is met to modify the virtualize runtime environment such that the virtual machine executes in the modified virtualized computing environment.

A temporal dynamic policy, in particular, may include a virtual machine management action and a temporal condition that triggers the performance of the virtual machine management action for the policy. A virtual machine management action, in this regard, may refer to various types of actions that modify a virtualized computing environment, e.g., due to a modification to a virtual machine, a modification to the runtime environment within which a virtual machine is running, a modification to a host that is running a virtual machine, an activation of an automated energy policy on a host, etc. Moreover, it will be appreciated that a modification to a virtualized computing environment, from the perspective of a virtual machine, may include the migration of that virtual machine and/or other virtual machines to a different host, such that the host upon which the virtual machine resides after the action presents a modified environment within which the virtual machine executes relative to that of the prior host. As one example, migration of a virtual machine to a different host that supports different redundancies and/or failover capabilities may be considered to be a virtual machine management action that modifies the virtualized computing environment within the context of a temporal dynamic policy.

In some embodiments, a virtual machine management action may include activation or deactivation of high availability functionality for the virtual machine. High availability functionality may include, for example, functionality that enables automatic restart of a virtual machine in response to a fault, automatic failover of a virtual machine to a different host in response to a host crashing, etc. Further, in some embodiments, high availability functionality may include activation or deactivation of additional redundancies for fault tolerance purposes, e.g., to add a redundant storage or network path, to place the virtual machine on a host with redundant services such as redundant virtual input/output servers (VIOSs), to change the virtual machine to a different storage connectivity group, etc. It will also be appreciated from the above discussion that a virtual machine management action may also activate/deactivate high availability functionality by migrating or otherwise placing a virtual machine on a particular host or group of hosts having some desired configuration, e.g., to migrate a long-running virtual machine to a different host with additional redundancies to provide additional high availability support to the virtual machine.

In some embodiments, a virtual machine management action may include activation or deactivation of placement optimization functionality for the virtual machine. Placement optimization functionality may include, for example, functionality that periodically re-evaluates workload across one or more hosts and dynamically migrates virtual machines to different hosts to balance overall workload. Placement optimization functionality may also include functionality that implements an energy policy, e.g., to consolidate virtual machines on fewer numbers of hosts to enable one or more hosts to be powered down or otherwise transitioned to a lower power state to conserve energy consumption. A virtual machine management action may, in some embodiments, enable or disable a virtual machine's participation in such placement optimization, while in some embodiments, placement optimization functionality may be enabled for certain hosts, and a virtual machine management action may incorporate migrating the virtual machine to one of the hosts for which such optimization is enabled.

Further, it will be appreciated that in some embodiments, a virtual machine management action may directly modify the underlying virtualized computing environment, while in some embodiments, a virtual machine management action may change one or more attributes associated with a virtual machine such that other functionality operating in the virtualized computing environment processes the virtual machine in a different manner due to the change to the virtual machine attribute. As one example, where it is desirable to activate high availability functionality for a virtual machine that increases input/output redundancy for the virtual machine, a virtual machine management action may increase a VIOS attribute for a virtual machine such that functionality that places virtual machines on hosts will later detect that the virtual machine needs to be migrated to another host that meets the new value for the VIOS attribute. As another example, a resource allocation for a virtual machine may be changed, e.g., to resize a virtual machine's resource allocation to a "maximum" size for the virtual machine, which may result in a subsequent rebalancing of workloads on different hosts and the migration of one or more virtual machines.

In addition, in some embodiments, a virtual machine management action may be automatically performed without further administrator input, while in other embodiments, a virtual machine management action may be preceded by a notification to an administrator, e.g., in the form of a suggestion. For example, a pop-up notification may be generated with a suggestion to modify a virtual machine attribute. As another example, notifications may be bundled such that an administrator may be presented with a daily list of virtual machines that the system recommends to move to a high availability and/or more power efficient host group based upon the fact that the virtual machines on the list have been active for a threshold amount of time. Similarly, an administrator may be presented with a periodic list of virtual machines to demote and remove redundancy based upon the fact that the virtual machines on the list have been idle for a threshold amount of time.

A temporal condition for a policy may compare one or more temporal attributes of a virtual machine against a time-related condition. A temporal attribute, in this regard, may refer to any time-related attribute of a virtual machine, e.g., based upon a point in time at which an event occurred or a duration since an event occurred. A temporal attribute may be represented in some embodiments by a time stamp, and may include a time of day and/or a date in some embodiments. A temporal attribute may also be represented by a duration, e.g., based upon a running timer. Further, a temporal attribute may be based upon a number of different types of events that may be associated with the life cycle of a virtual machine, e.g., when the virtual machine was created, deployed, activated, deactivated, idled, etc. In some embodiments, an event may also be associated with when a virtualized computing environment was modified by a prior virtual machine management action (e.g., due to an action that modified the environment itself and/or a virtual machine deployed thereto).

A temporal condition may compare temporal attributes against customizable threshold values, and different comparisons may be used in some embodiments, e.g., greater than, greater than or equal to, equal to, less than, less than or equal to, within a range, etc. Thus, for example, a temporal dynamic policy might include a temporal condition such as "time since activation is greater than 10 days," or "idled at least 4 days and 3 hours," etc.

In some embodiments, policies are associated with virtual machines, although in some embodiments, such association may be based upon other aspects of the virtualized computing environment. A policy may be associated with a virtual machine through a programmatic interface such as a virtual machine creation API and/or a graphical user interface such as a browser-based interface. Policies may be assigned to particular hosts or host groups such that all virtual machines deployed to or placed upon such hosts are automatically associated with the policies (e.g., separate policies for development, production, database, enterprise, transactional, etc. hosts). In addition, in some embodiments, policies may be associated with virtual machine templates or flavors, such that virtual machines created from such templates or flavors are automatically associated with such policies. Policies may also be manually associated with virtual machines, or may be manually modified or configured, and in some embodiments, policies may be assigned to particular types of virtual machines and/or hosts.

In some embodiments, a temporal dynamic policy may be associated with a virtual machine in connection with creation of the virtual machine, and the policy may be persisted in a data store such as a database of virtual machine attributes or properties. Then, a periodic task or daemon may periodically collect temporal attributes for the virtual machine and periodically compare collected temporal attributes with the temporal condition(s) associated with the temporal dynamic policy to determine if the virtual machine management action(s) of the temporal dynamic policy should be performed. In some embodiments, the periodic task may be integrated into a placement scheduler of a cloud computing platform. Further, in some embodiments, the rate at which temporal attributes are collected and the rate at which the collected temporal attributes are compared against the temporal conditions of any temporal dynamic policies may be the same, while in other embodiments, the rates may be different.

Figure 4:
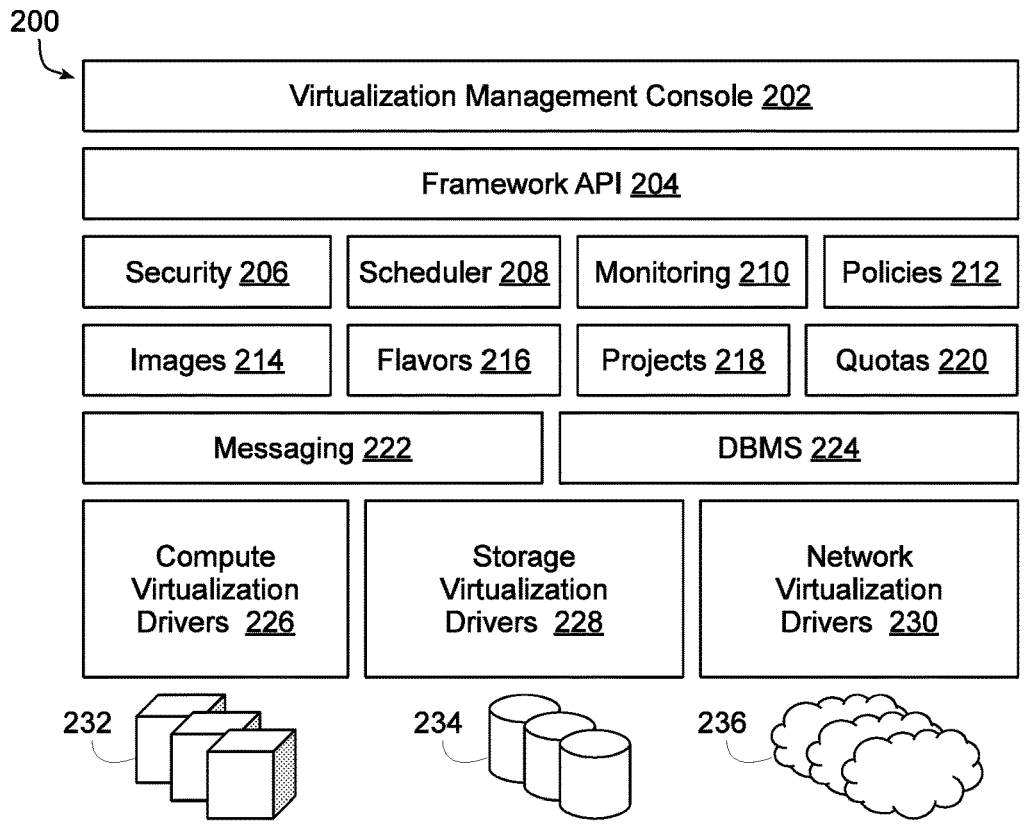
FIG. 4 is a block diagram of example software components in a cloud computing framework for use in performing virtualization management in the virtualized computing environment of FIGS. 3A-3B.

Now turning to FIG. 4, temporal dynamic policies may be implemented within a cloud computing framework such as framework 200. Framework 200 may be based in some embodiments on the OpenStack architecture, and may include a virtualization management console 202 that interfaces with the framework through a framework API 204. A management service layer includes a security service 206, a scheduler service 208, and monitoring service 210, which respectively provide security, virtual machine scheduling/placement and event monitoring functionality. Additional management functionality manages various persisted entities in the framework, including policies 212, images 214, flavors 216, projects 218 and quotas 220. Policies 212 may include, in some embodiments, the herein-described temporal dynamic policies, among other policies related to virtualization management. Images 214 refer to disk or server images for virtual machines, including images used for templates, as well as images used for backups. Flavors 216 refer to virtual hardware templates that define various configuration settings for virtual machines, e.g., sizes for virtual memory, disk, virtual CPUs, etc. Projects 218 refer to tenants, or groups of users, and quotas 220 refer to operational limits established for different projects.

A middleware layer may include a messaging service 222, e.g., an AMQP (Advanced Message Queuing Protocol) message broker, and a database service (DBMS) 224. In addition, virtualization drivers, e.g., compute virtualization drivers 226, storage virtualization drivers 228, and network virtualization drivers 230 respectively interface with physical compute resources 232, physical storage resources 234 and physical network resources 236.

Elements of framework 200 may be implemented, for example, in a virtualization manager controller 140 (FIG. 3A), with other elements implemented within one or more hosts, e.g., within one or more virtual machines resident on one or more hosts. In other embodiments, however, various elements of framework 200 may be implemented in other hardware, whether external or internal to a virtualized computing environment.

Figure 5:
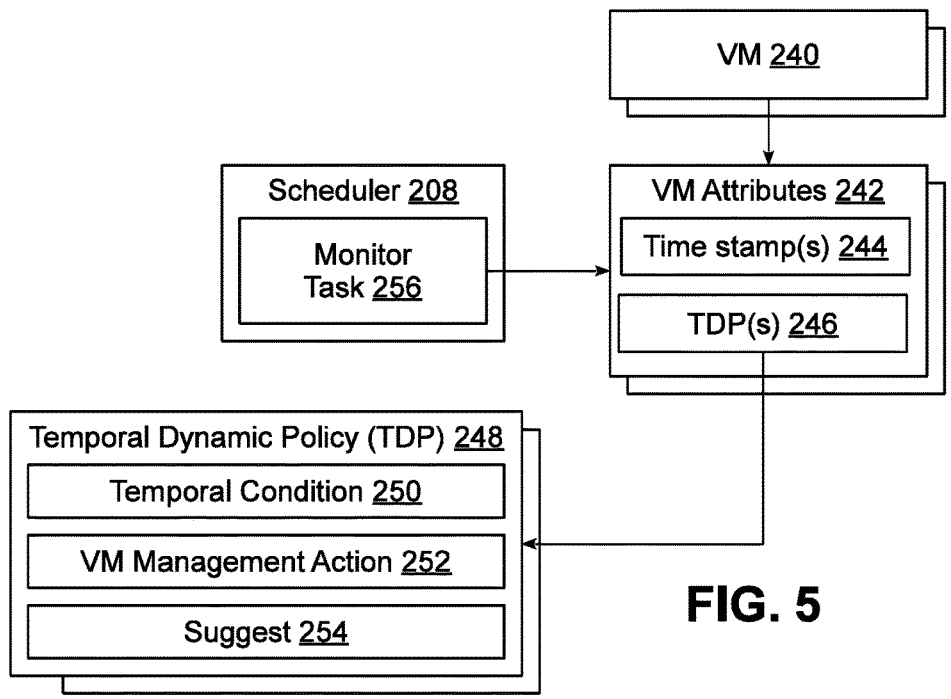
FIG. 5 is a block diagram of various data structures for use in implementing temporal dynamic policies in the virtualized computing environment of FIGS. 3A-3B.

In the illustrated embodiment, the management and monitoring of temporal dynamic policies may be implemented at least in part using virtualization management console 202 and scheduler 208, and FIG. 5 illustrates in greater detail a number of software entities and data structures that may be utilized to implement temporal dynamic policies in some embodiments of the invention. A virtual machine 240, for example, may have a number of attributes 242 defining the settings and/or configuration of the virtual machine. Among these attributes 242 may be one or more time stamps 244 and one or more identifiers 246 for one or more temporal dynamic policies 248 to be associated with the virtual machine. In some embodiments, for example, one or more time stamps may be created for a virtual machine in association with various events occurring during the lifetime of the virtual machine, e.g., creation, deployment, activation, deactivation, transition to an idle state, or last modification by a virtual machine management action, among others.

Each temporal dynamic policy 248 identifies a temporal condition 250 and a virtual machine management action 252. As noted above, a temporal condition may identify a threshold against which a temporal attribute of a virtual machine, e.g., a time stamp, may be compared. A virtual machine management action may include any of the aforementioned types of virtual machine management actions, e.g., related to activating or deactivating high availability and/or ongoing optimization functionality, modifying a virtual machine configuration, migrating a virtual machine to a different host, activating or deactivating an energy-related optimization, etc.

In addition, in some embodiments, a suggest flag 254 may be incorporated into a policy to indicate whether an administrator should be notified with a suggestion prior to performing the associated action for the policy. In some embodiments, all actions may be preceded by notifications to an administrator prior to being performed, while in other embodiments, actions may be performed with no prior notification to an administrator. Further, in some embodiments, some types of actions may be associated with notifications, while others may not.

The creation of temporal dynamic policies and the association of such policies with virtual machines may be managed in some embodiments through the virtualization management console 202 (FIG. 4). In some embodiments, for example, a web-based user interface may be used. In addition, a programmatic interface, e.g., a REST API, may also be supported in some embodiments. As is also illustrated in FIG. 5, the monitoring of temporal dynamic policies may be implemented using a monitor task or daemon 256 resident in scheduler 208, in a manner that will become more apparent below.

Figure 6:
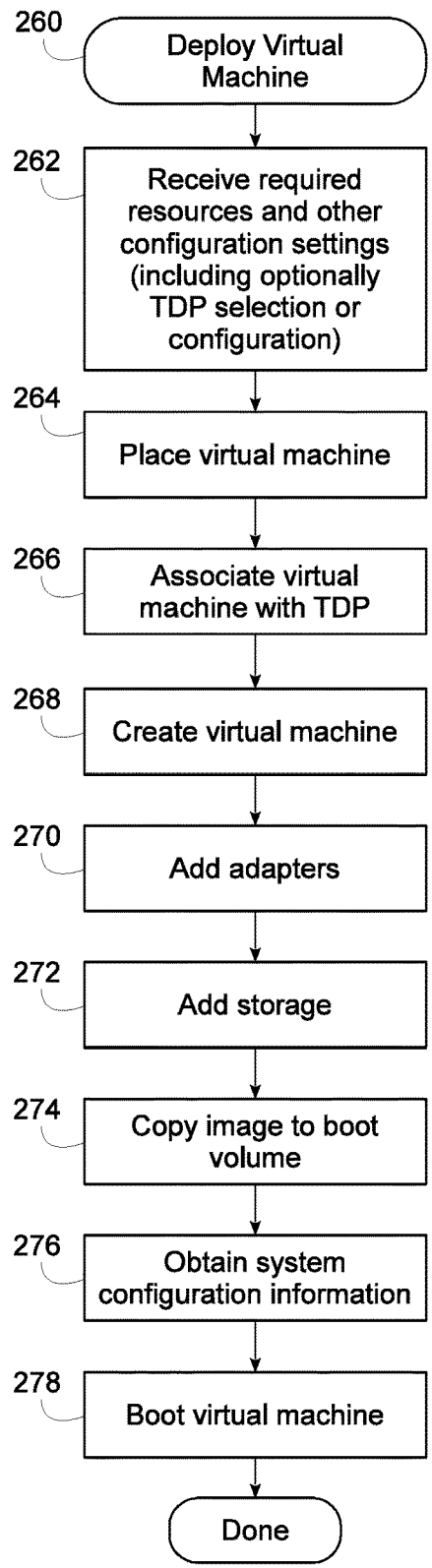
FIG. 6 is a flowchart illustrating a sequence of operations for deploying a virtual machine in the virtualized computing environment of FIGS. 3A-3B.

FIG. 6 illustrates at 260 an example sequence of operations for deploying a virtual machine, which in this embodiment includes associating the virtual machine with a temporal dynamic policy. The sequence of operations may be initiated, for example, in response to an administrator request to deploy a new virtual machine to a virtualized computing environment, and may be performed, for example, in response to interaction via a graphical user interface, which may be run locally in environment or remotely in an external computer coupled to the environment.

Deployment of a virtual machine, in this context, refers to the creation and boot up/power on of a new virtual machine in the virtualized computing environment, and begins in block 262 by receiving any required resources and/or other configuration settings for the virtual machine to be deployed. A user (e.g., an administrator) may specify, for example, a desired number of virtual processors, a desired amount of virtual memory, a desired amount of virtual storage, desired network and/or storage connections, etc., as well as settings such as performance tunings, virtual machine name, type of storage, number of storage disks or volumes, etc. In addition, a user may specify a template or flavor upon which the virtual machine is to be based.

Next, in block 264, the virtual machine to be deployed is placed on a host, i.e., a host for the virtual machine is selected from a plurality of hosts in the virtualized environment. A host may selected based upon various factors, including compatibility with the virtual machine requirements and settings specified by the administrator as well as optimizing the overall performance of the virtualized environment by balancing workloads.

Next, once a host is selected for the virtual machine, the virtual machine is associated with a temporal dynamic policy in block 266. As noted above, in some embodiments, temporal dynamic policies may be assigned to virtual machines automatically and based on other aspects of the virtualized computing environment, e.g., the host upon which a virtual machine has been placed. For example, it may be desirable to associate temporal dynamic policies with particular hosts, types of hosts, or host groups, such that any virtual machine placed on a matching host will be automatically associated with a temporal dynamic policy. Further, as illustrated in block 262, in some embodiments a user may be able to optionally select and/or configure a temporal dynamic policy when initially configuring the virtual machine. As noted above, in some embodiments it may be desirable to manually specify and configure a temporal dynamic policy for a particular virtual machine. In other embodiments, temporal dynamic policies may be associated with particular flavors or templates such that any virtual machines based off of those flavors or templates will be automatically associated with such policies. In addition, in some embodiments, temporal dynamic policies automatically associated with virtual machines may still be modified after an automatic assignment.

Next, the virtual machine is created in block 268, e.g., by instructing virtual machine management functionality on the selected host to create a new virtual machine on that host. Next, in block 270, one or more virtual adapters may be added to the virtual machine, e.g., to create network and/or storage connectivity, and in block 272, one or more virtual storage volumes may be added for the virtual machine. Then, in block 274, a virtual machine image is copied to the boot volume, e.g., from a collection of pre-stored images including the operating system and application(s) to execute in the virtual machine.

Block 276 next obtains system configuration information for the operating system of the virtual machine, e.g., information such as host name, IP address, etc. In some embodiments, for example, a virtual optical drive may be added to the virtual machine with the system configuration information provided on a virtual optical disc. In other embodiments, the system configuration information may be obtained in another manner, e.g., via a networked metadata service. Then, in block 278, the virtual machine is booted. Booting a virtual machine is analogous to powering on a physical computer and bringing it into a fully active state, and thus may be considered to incorporate the initialization and execution of program code of the virtual machine to bring the virtual machine into a fully active state.

It will be appreciated that the deployment of virtual machines may be implemented in a number of different manners in different virtualized environments. As such, a number of different alternative processes may be used in other embodiments, as will be appreciated by one of ordinary skill in the art having the benefit of the instant disclosure.

Figure 7:
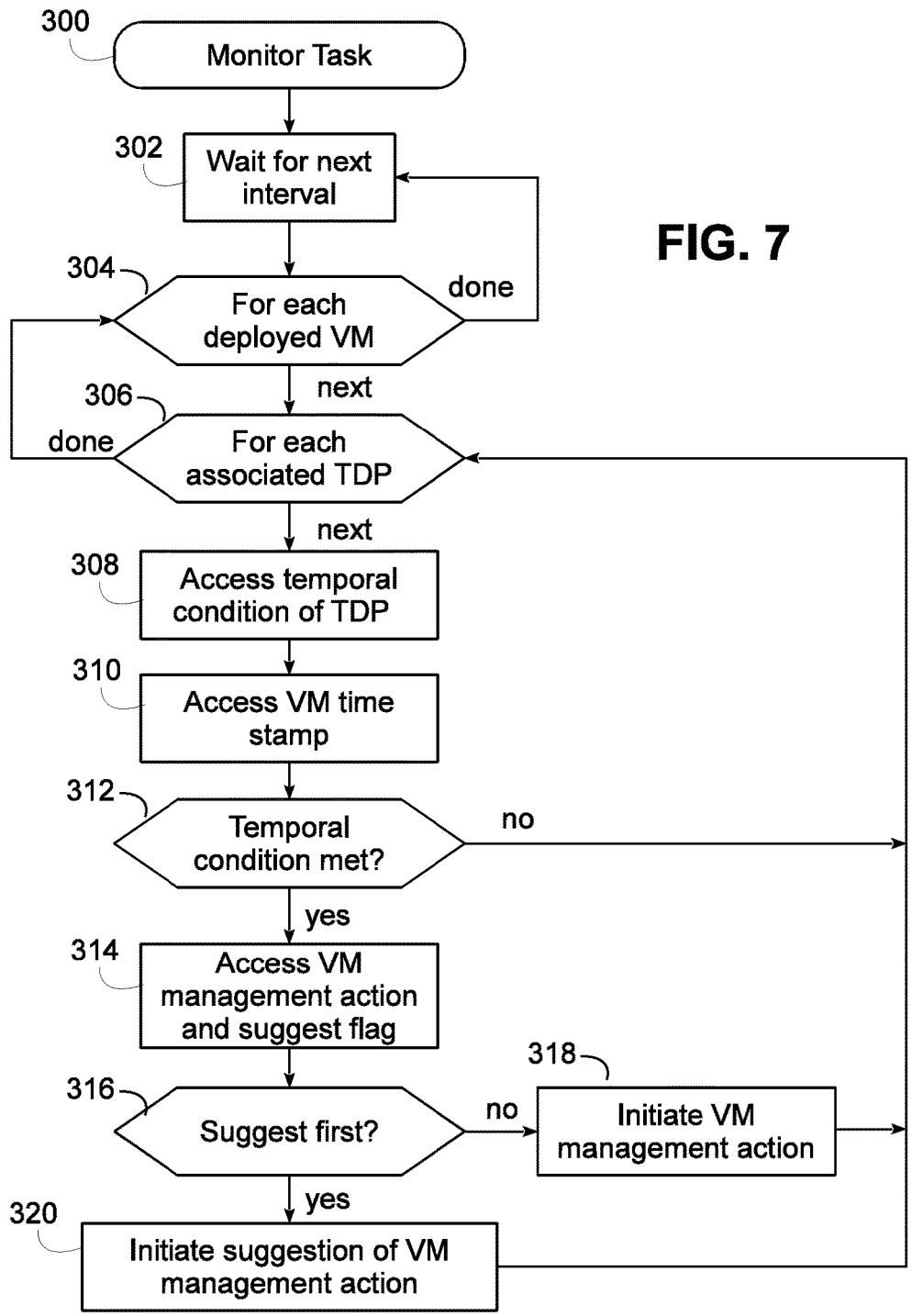
FIG. 7 is a flowchart illustrating a sequence of operations for the monitor task referenced in FIG. 5.

FIG. 7 next illustrates an example sequence of operations 300 for monitor task 256 (FIG. 5), which periodically monitors the temporal dynamic policies associated with the deployed virtual machines in a virtualized computing environment. Block 302 defines a monitoring interval, and blocks 304 and 306 initiate a pair of nested FOR loops that, at each monitoring interval, analyze each temporal dynamic policy for each deployed virtual machine in the virtualized computing environment. For each such virtual machine and associated temporal dynamic policy, block 308 accesses the temporal condition of the temporal dynamic policy, and block 310 accesses the time stamp (temporal attribute) for the virtual machine that is to be tested by the temporal condition. Block 312 then determines whether the temporal condition is met. If not, control returns to block 306 to process any additional temporal dynamic policies associated with the virtual machine, or if no other such policies exist, to process any remaining virtual machines.

If the condition is met, however, block 312 passes control to block 314 to access the virtual machine management action and suggest flag for the temporal dynamic policy. Block 316 determines if the suggest flag is set, and if not, passes control to block 318 to initiate the virtual machine management action, and then to return control to block 306 to process additional temporal dynamic policies and/or deployed virtual machines. In addition, block 318 may also, in some embodiments, update a modified time stamp for the virtual machine to log the modification to the virtualized computing environment by the virtual machine management action.

Returning to block 316, if the suggest flag is not set, control passes to block 320 to initiate a suggestion of the virtual machine management action, e.g., through a notification to an administrator, and then return control to block 306. In such a notification, an administrator may be provided with suitable information regarding the suggested action, and may additionally be provided with an interface to enable the virtual machine management action to be performed and/or configured by the administrator. In such a scenario, further administrator action may be required in order to complete the action. Nonetheless, the action may still be considered to have been initiated as a result of the triggered temporal condition of the temporal dynamic policy.

FIG. 8 next illustrates an example user interface 400 that may be presented to an administrator in order to create or edit a temporal dynamic policy. Interface 400 may include separate panels 402, 404 and 406 to configure an identifier/name, temporal condition, and virtual machine management action to be associated with the temporal dynamic policy. In panel 402, for example, a name or identifier for the policy may be entered in a text box 408, and it may be seen in the figure that the example name is "HostGroupA" to indicate that the policy is associated with any virtual machines placed on a host from Host Group A. As such, it will be appreciated that interface 400 may be accessed in some embodiments in connection with managing a host group, rather than managing a particular virtual machine.

In panel 404, a temporal condition may be specified, for example, by inputting a numerical value for a number of days into a textbox 410 and then selecting from among a number of different time stamps displayed in a list box 412. In the figure, for example, a temporal condition of "greater than or equal to 30 days from the activation date of the virtual machine" has been selected.

In panel 406, an action may be selected, e.g., from among a plurality of radio buttons 414. Various actions, which may be restricted to context appropriate actions, may be presented to an administrator. For example, the figure includes actions such as creating a redundant storage path for the virtual machine, moving the virtual machine to a high availability host group, changing a storage connectivity group for the virtual machine, changing a resource allocation for the virtual machine, enabling an energy optimization policy, removing a redundant storage path, disabling high availability functionality, etc. For more specific settings for the selected action, a configure button 416 may be provided to open another context-appropriate interface, e.g., a dialog window, to enable an administrator to configure the action. As an example, the figure illustrates the selection of a "move virtual machine to high availability host group" action, and as such, button 416 may open an interface providing options to specify an identifier for the particular high availability host group to which the virtual machine should be migrated upon triggering of the associated temporal condition. It will be appreciated that different actions may be associated with different types of conditions, and as such, in some embodiments the list of available actions may change based upon the selected condition.

Panel 406 may also include a checkbox 418 to enable an administrator to set or clear a suggest flag and thereby control whether the administrator will be notified prior to performing the selected action. Save and cancel buttons 420, 422 are also provided to either save the policy or cancel the creation/edits for the policy.

It will be appreciated that other interfaces may be used to configure and manage temporal dynamic policies in other embodiments. Moreover, it will be appreciated that the number of different types of virtual machine management actions that may be associated with temporal dynamic policies is practically innumerable, and that the various virtual machine management actions that may be supported in any particular virtualized computing environment may vary substantially for different environments. Therefore, the invention is not limited to the particular interfaces and/or actions disclosed herein.

As will be appreciated from the foregoing, in some embodiments consistent with the invention, temporal dynamic policies may be used to provide automatic modifications to a virtualized computing environment and/or notifications as to suggested modifications to a virtualized computing environment based upon the relative "ages" of virtual machines, thereby effectively enabling different management approaches to be applied to different types of virtual machines (e.g., short-running v. long-running). In doing so, overall reliability and/or performance may be improved system-wide, and often with reduced administrative burden.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of managing a virtualized computing environment, the method comprising:
   collecting a temporal attribute for a virtual machine deployed in the virtualized computing environment;
   determining a temporal condition and a virtual machine management action associated with a policy for the virtual machine, wherein the virtual machine management action is associated with a modification of the virtualized computing environment;
   determining from the collected temporal attribute for the virtual machine whether the determined temporal condition is met, wherein determining whether the temporal condition is met is based at least in part upon a duration from an event associated with the virtual machine or the virtualized computing environment, wherein the temporal condition includes a threshold duration, and wherein determining whether the temporal condition is met includes determining whether the duration from the event meets or exceeds the threshold duration; and
   initiating the determined virtual machine management action in response to determining that the determined temporal condition is met to modify the virtualized runtime environment such that the virtual machine executes in the modified virtualized computing environment, wherein the virtual machine management action activates or deactivates high availability functionality for the virtual machine, activates or deactivates placement optimization functionality for the virtual machine, or causes the virtual machine to be migrated to a different host, and wherein the virtual machine management action is initiated in response to the determination that the determined temporal condition is met.

2. The method of claim 1, wherein collecting the temporal attribute for the virtual machine includes determining a time or duration associated with creation, deployment, activation, deactivation or idling of the virtual machine.

3. The method of claim 1, wherein collecting the temporal attribute for the virtual machine includes determining a time or duration associated with a modification to the virtualized runtime environment from a prior virtual machine management action.

4. The method of claim 1, wherein determining the temporal condition and the virtual machine management action includes retrieving the policy from a data store.

5. The method of claim 1, wherein the policy comprises a temporal dynamic policy.

6. The method of claim 1, wherein the policy further includes a suggest flag, and wherein initiating the determined virtual machine management action includes selectively generating a notification suggesting the determined virtual machine management action based upon the suggest flag.

7. The method of claim 1, wherein the temporal attribute is associated with the event.

8. The method of claim 1, wherein collecting the temporal attribute, determining the temporal condition and virtual machine management action, determining whether the determined temporal condition is met, and initiating the determined virtual machine management action are performed by a monitor task.

9. The method of claim 8, wherein the monitor task is resident in a scheduler of a cloud computing framework.

10. The method of claim 1, further comprising associating the policy with the virtual machine in connection with deploying the virtual machine to the virtualized computing environment.

11. The method of claim 10, wherein associating the policy with the virtual machine is performed in response to user input.

12. The method of claim 10, wherein the policy is associated with one or more hosts in the virtualized computing environment, and wherein associating the policy with the virtual machine is performed in response to placement of the virtual machine on a host among the one or more hosts.

13. The method of claim 10, wherein the policy is associated with a virtual machine template, and wherein associating the policy with the virtual machine is performed based upon creation of the virtual machine from the virtual machine template.

14. The method of claim 1, wherein the virtual machine management action activates or deactivates high availability functionality for the virtual machine.

15. The method of claim 1, wherein the virtual machine management action activates or deactivates placement optimization functionality for the virtual machine.

16. The method of claim 1, wherein the virtual machine management action causes the virtual machine to be migrated to a different host.

17. The method of claim 16, wherein the virtual machine management action migrates the virtual machine to the different host to provide additional high availability support to the virtual machine.

18. The method of claim 16, wherein the virtual machine management action migrates the virtual machine to the different host to enable a prior host to which the virtual machine was previously deployed to be transitioned to a lower power state.

* * * * *